(12) United States Patent
Krishnamoorthi et al.

(10) Patent No.: US 8,676,115 B2
(45) Date of Patent: Mar. 18, 2014

(54) APPARATUS AND METHODS FOR TESTING USING MODULATION ERROR RATIO

(75) Inventors: Raghuraman Krishnamoorthi, San Diego, CA (US); Thomas Sun, San Diego, CA (US); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1538 days.

(21) Appl. No.: 11/834,679

(22) Filed: Aug. 6, 2007

(65) Prior Publication Data

US 2008/0242225 A1   Oct. 2, 2008

Related U.S. Application Data

(60) Provisional application No. 60/908,961, filed on Mar. 29, 2007.

(51) Int. Cl.
*H04B 17/02*   (2006.01)

(52) U.S. Cl.
USPC .................................. 455/9; 455/7; 370/344

(58) Field of Classification Search
USPC ............ 455/9, 101, 7; 370/344; 375/261, 298
See application file for complete search history.

(56) References Cited

U.S. PATENT DOCUMENTS

| | | |
|---|---|---|
| 2005/0088959 A1 | 4/2005 | Kadous |
| 2005/0122914 A1* | 6/2005 | Durso et al. ................. 370/270 |
| 2007/0223512 A1 | 9/2007 | Cooper et al. |
| 2007/0275680 A1* | 11/2007 | Kaiki et al. ................ 455/184.1 |

FOREIGN PATENT DOCUMENTS

| | | |
|---|---|---|
| EP | 0703685 | 3/1996 |
| JP | 2005000908 A | 1/2005 |
| JP | 2005-244918 | * 9/2005 |
| JP | 2005-311570 | * 11/2005 |
| JP | 2006-287342 | * 10/2006 |
| TW | 545006 B | 8/2003 |
| TW | 583842 B | 4/2004 |
| TW | I230525 | 4/2005 |
| WO | WO03047197 | 6/2003 |
| WO | WO2006104105 A1 | 10/2006 |

OTHER PUBLICATIONS

International Search Report—PCT/US08/057388—International Search Authority, European Patent Office—Aug. 8, 2008.
Written Opinion—PCT/US08/057388—International Search Authority, European Patent Office—Aug. 8, 2008.
International Preliminary Report on Patentability, PCT/US2008/057388, International Bureau of WIPO, Oct. 8, 2009.
Taiwan Search Report—TW097111522—TIPO—Aug. 30, 2011.

\* cited by examiner

*Primary Examiner* — Nay A Maung
*Assistant Examiner* — Angelica M Perez
(74) *Attorney, Agent, or Firm* — Fulbright & Jaworski LLP

(57) ABSTRACT

Apparatus and methods are disclosed for testing or qualifying a repeater/transmitter in a multicarrier system by utilizing modulation error ratio (MER). In particular, a disclosed method includes determining an estimated effective modulation error ratio of an output of the repeater/transmitter. The estimated effective modulation error ratio is compared with a predetermined threshold, and the repeater/transmitter is qualified when the estimated effective modulation error ratio is greater than the predetermined threshold. Using an estimated modulation error ratio for repeater/transmitters, which can have non-flat modulation error ratios over a total number of subcarriers, affords an efficient method to test and qualify repeater/transmitters.

35 Claims, 9 Drawing Sheets

APPARATUS AND METHODS FOR TESTING USING MODULATION ERROR RATIO

CLAIM OF PRIORITY UNDER 35 U.S.C. §119

The present Application for Patent claims priority to Provisional Application No. 60/908,961 entitled "MODULATION ERROR RATIO FOR TEST" filed Mar. 29, 2007, and assigned to the assignee hereof and hereby expressly incorporated by reference herein.

BACKGROUND

1. Field

The present disclosure relates generally to methods and apparatus for testing of communications systems, and more particularly to apparatus and methods for testing a multicarrier wireless system using a modulation error ratio.

2. Background

Multicarrier wireless systems include Forward Link Only (FLO), which is a digital wireless technology that has been developed by an industry-led group of wireless providers. The FLO technology was designed, in part, for a mobile multimedia environment and exhibits performance characteristics suited for cellular handset use. FLO technology uses orthogonal frequency division multiplexing (OFDM) and advances in coding and interleaving to achieve high-quality reception, both for real-time content streaming and other data services. FLO technology can provide robust mobile performance and high capacity without compromising power consumption. The technology also reduces the network cost of delivering multimedia content by dramatically decreasing the number of transmitters that need to be deployed.

FLO wireless systems may be used, in particular, to broadcast real time audio and video signals, apart from non-real time services to mobile users. Broadcast transmission is typically carried out using tall and high power transmitters or to employ repeater/transmitters to ensure wide coverage or extend coverage over a given geographical area. Given the nature of FLO broadcasts, which support multimedia data, it is important that the transmitted signal and, hence, the transmitter or repeater/transmitter, provide good performance over a range of channel conditions. Accordingly, the ability to accurately, yet efficiently, test transmitter or repeater/transmitter performance is desirable.

Known approaches for testing transmitter performance include an effective signal to noise ratio (SNR) approach, which provides a good measure of FLO device performance under a range of channel conditions. For repeater/transmitters, however, using an effective SNR approach is not appropriate, since the performance of the repeater/transmitter in such a method is determined by implementation noise instead of channel noise.

SUMMARY

According to an aspect, a method for qualifying a repeater/transmitter in a multicarrier system is disclosed. The method includes determining an estimated effective modulation error ratio of an output of the repeater/transmitter, and comparing the estimated effective modulation error ratio with a predetermined threshold. The method further includes qualifying the repeater/transmitter when the estimated effective modulation error ratio is greater than the predetermined threshold.

In another aspect, an apparatus for testing a repeater/transmitter in a multicarrier system is disclosed. The apparatus includes a first module configured to determine an estimated effective modulation error ratio of an output of the repeater/transmitter. Additionally, a second module configured to compare the estimated effective modulation error ratio with a predetermined threshold is included. A third module then qualifies the repeater/transmitter when the estimated effective modulation error ratio is greater than the predetermined threshold.

According to still another aspect, at least one processor configured to perform a method for qualifying a repeater/transmitter in a multicarrier system is disclosed. The method performed includes determining an estimated effective modulation error ratio of an output of the repeater/transmitter, comparing the estimated effective modulation error ratio with a predetermined threshold, and qualifying the repeater/transmitter when the estimated effective modulation error ratio is greater than the predetermined threshold.

In yet another aspect, an apparatus for testing a repeater/transmitter in a multicarrier system is disclosed. The apparatus includes means for determining an estimated effective modulation error ratio of an output of the repeater/transmitter, means for comparing the estimated effective modulation error ratio with a predetermined threshold, and means for qualifying the repeater/transmitter when the estimated effective modulation error ratio is greater than the predetermined threshold.

According to still a further aspect, a computer program product including a computer-readable medium is disclosed. The computer-readable medium includes code for causing a computer to determine an estimated effective modulation error ratio of an output of the repeater/transmitter, code for causing a computer to compare the estimated effective modulation error ratio with a predetermined threshold, and code for causing a computer to qualify the repeater/transmitter when the estimated effective modulation error ratio is greater than the predetermined threshold.

DETAILED DESCRIPTION

The present disclosure describes methods and apparatus for testing a repeater/transmitter in a multicarrier system by using a determined effective modulation error ratio to qualify the performance of the repeater/transmitter. As discussed above, although using an effective signal to noise ratio (SNR) provides a good measure of FLO device performance under a range of channel conditions, is not appropriate for repeater/transmitter testing, since the performance of the repeater/transmitter is determined by implementation noise instead of channel noise. Hence, the present application discloses apparatus and methods using an effective modulation error ratio (MER) to measure repeater/transmitter performance.

Figure 1:
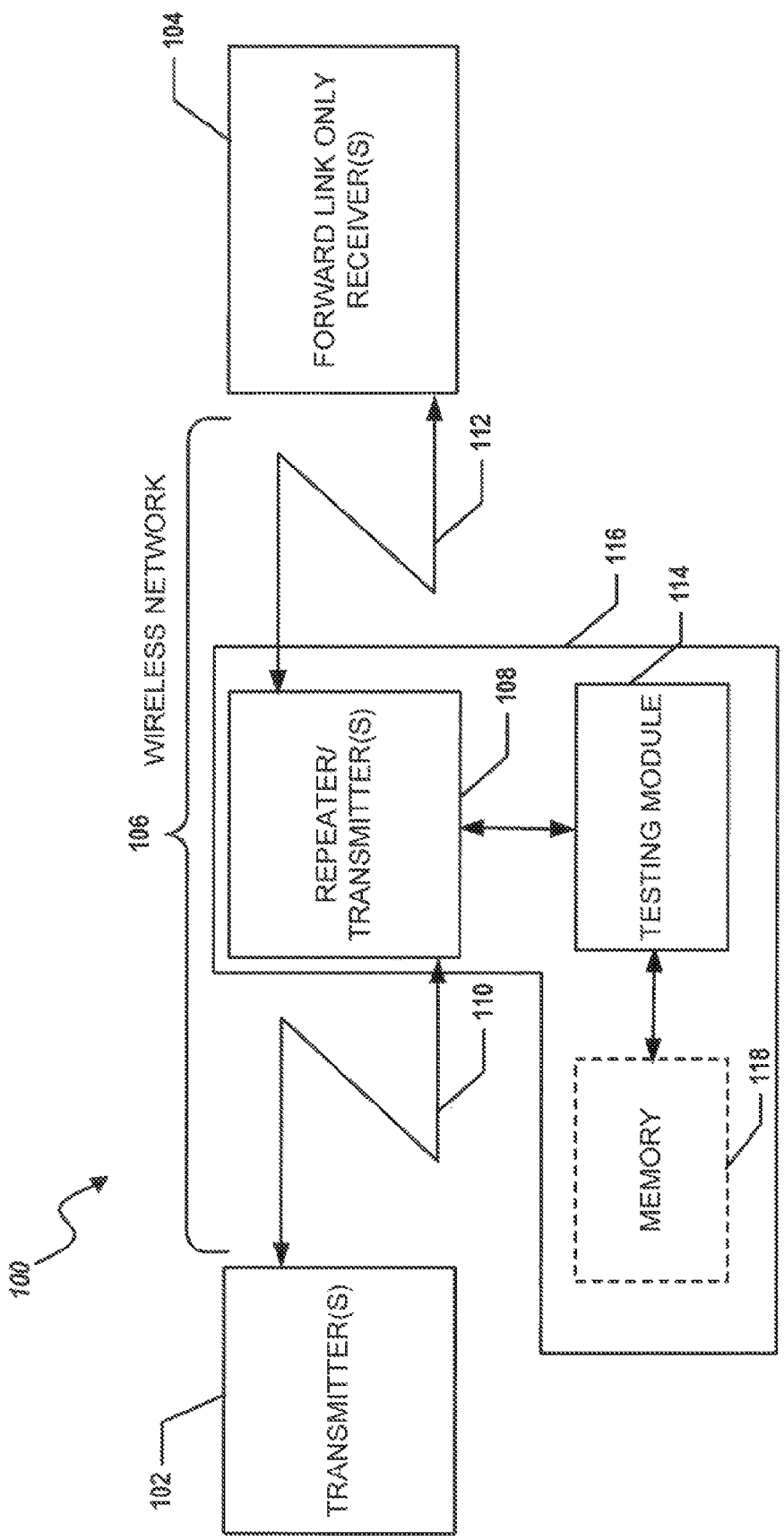
FIG. 1 illustrates a wireless network system employing an exemplary testing apparatus.

MER is the ratio of the average symbol power to the average implementation error power and is normally expressed in decibels (i.e., MER (in dB)=10 $\log_{10}$ (average symbol power/average implementation error power)). MER is a direct measure of repeater/transmitter implementation that provides great insight about the type of impairments of performance that may exist due to imperfect implementation. Since the output signal from a repeater/transmitter can have non-flat MER over all FLO sub-carriers, it is useful to employ a metric to qualify the performance of the repeaters or transmitters having a low Modulation Error Ratio (MER) on some subcarriers. FIG. 1 illustrates an exemplary testing apparatus included in a wireless network system 100, such as a forward link only (FLO) network, for example. The system 100 includes at least one transmitter 102 that communicates with one or more receivers 104 over a wireless network 106. Receivers 104 may include any number of types of communicating devices such as cell phones, computers, personal data assistants, hand held or laptop devices, and so forth. Network 106 may include one or more repeater/transmitters 108, which receive a signal 110 from transmitter 102 and, in turn, repeat transmit the signal (shown as signal 112) to either the one or more receivers 104 or, alternatively, to yet one or more further repeater/transmitters (not shown).

The system 100 may further include a testing module 114, which may be used to qualify; i.e., test the quality or health of the signal being transmitted from the repeater/transmitter 108 and establish performance is above a predetermined acceptable level. As shown in FIG. 1, the testing module 114 may be separate from the repeater/transmitter 108 and selectively coupled to the repeater/transmitter 108 fop testing/qualification. Alternatively, the testing module 114 may be incorporated as part of repeater/transmitter apparatus as indicated with box 116. Furthermore, although module 114 is shown as a unitary module, the module 114 may be configured also as two or more distinct logic modules configured to effect distinct processes for testing and/or qualifying a repeater/transmitter.

It is noted here that the module 114 may be implemented by hardware, software, firmware, or any combination thereof. The module 114 may at least in part include a processor (not shown), such as an ASIC, that is configured to execute code stored on a computer readable medium, illustrated generally by memory device 118. Additionally, the module 114 may be configured to measure characteristics of the repeater/transmitter 108, such as SNR and the modulation error ratio, using any suitable methods and/or apparatus.

Issues inherent to repeater/transmitters include the situation where the signal received by the repeater/transmitter (e.g., signal 110 from transmitter 102) may have some degree of fading. Thus, when the signal is repeat transmitted by repeater/transmitter 108, further noise may be introduced. As such, the output signal (e.g., signal 112) from a repeater/transmitter may have a non-flat modulation error ratio (MER) over all of the OFDM subcarriers. Accordingly, it is useful to consider a metric using the effective MER for those transmitters (e.g., repeater/transmitters) having low MER on some of the subcarriers.

Accordingly, an effective MER metric to be implemented by testing module 114 for qualifying the repeater/transmitter 108 may be utilized in the system 100. In particular, an effective MER metric can be defined by considering the effect of MER on channel capacity. It is known that channel capacity C may be calculated according to the relationship:

$$C = \frac{1}{N} \sum_n \log_2(1 + SNR) \qquad (1)$$

where SNR is the signal to noise ratio, N is the total number of subcarriers n, and the addition of white Gaussian noise is assumed. Accordingly, if C represents the total channel capacity and N is the number of subcarriers, the SNR of equation (1) can be substituted with the relationship $$\frac{P_n}{\sigma_w^2 + \alpha_n \cdot P_n}$$

where $\alpha_n$ is the inverse of MER (in linear domain) of subcarrier n, $P_n$ is the signal power on subcarrier n, and $\sigma_w^2$ is the thermal noise variance. Thus, substituting the above relationship into equation (1) yields:

$$C = \frac{1}{N} \sum_n \log_2\left(1 + \frac{P_n}{\sigma_w^2 + \alpha_n \cdot P_n}\right) \qquad (2)$$

If it is assumed that the operating SNR will be much higher than 0 dB, the relationship defined in equation (2) can be approximated as follows:

$$C \approx \frac{1}{N} \sum_n \log_2\left(\frac{P_n}{\sigma_w^2 + \alpha_n \cdot P_n}\right) = \log_2\left(\prod_n \left(\frac{SNR_n}{1 + \alpha_n \cdot SNR_n}\right)^{1/N}\right) \qquad (3)$$

If an additional assumption is made that the operating SNR is much lower than the MER on each subcarrier, equation (3) can be further approximated as:

$$C \approx \log_2\left(\prod_n \left(\frac{SNR_n^{1/N}}{1 + \alpha_n \cdot \frac{SNR_n}{N}}\right)\right) \approx \log_2\left(\frac{\prod_n SNR_n^{1/N}}{1 + \frac{1}{N}\sum_n (\alpha_n \cdot SNR_n)}\right). \qquad (4)$$

Next, assuming that the SNRs on all subcarriers n are very close in value, equation (4) can be simplified to the following relationship:

$$C \approx \log_2\left(\frac{\prod_n SNR^{1/N}}{1 + \frac{SNR}{N}\sum_n \alpha_n}\right). \qquad (5)$$

Comparing equation (5) with the channel capacity reduction due to a uniform MER of $\alpha$ (i.e., $\alpha$ is the inverse of MER (in linear domain)) it is noted that an effective MER can then be approximated by the following expression:

$$MER_{effective} = -10 \cdot \log_{10}\left(\frac{1}{N}\sum_n \frac{1}{MER_n}\right) \qquad (6)$$

where $MER_{effective}$ is the effective MER in decibels (dB), and $MER_n$ is the MER (in linear domain) of a sub-carrier n. It is further noted that the $MER_{effective}$ expression (6) above may be correlatively interpreted as an average of the repeater/transmitter noise variance across all sub-carriers. Thus, the averaging calculation in equation (6) could be alternatively expressed as $$\left(\frac{1}{N}\sum_n \frac{Var_n}{P_n}\right)$$

where $Var_n$ is the repeater noise variance and $P_n$ is the signal power on subcarrier n.

As one skilled in the art will appreciate, expression (6) yields a conservative value due to the approximation. This means that if the $MER_{effective}$ is high or meets a predefined threshold, the performance of the repeater/transmitter under test should be good or qualifiable. It is noted, however, that if the $MER_{effective}$ is not high enough, the performance of the repeater/transmitter under test is not necessarily bad or unqualifiable. Accordingly, in the latter case, further testing is required to determine if the repeater/transmitter is good or qualified.

Figure 2:
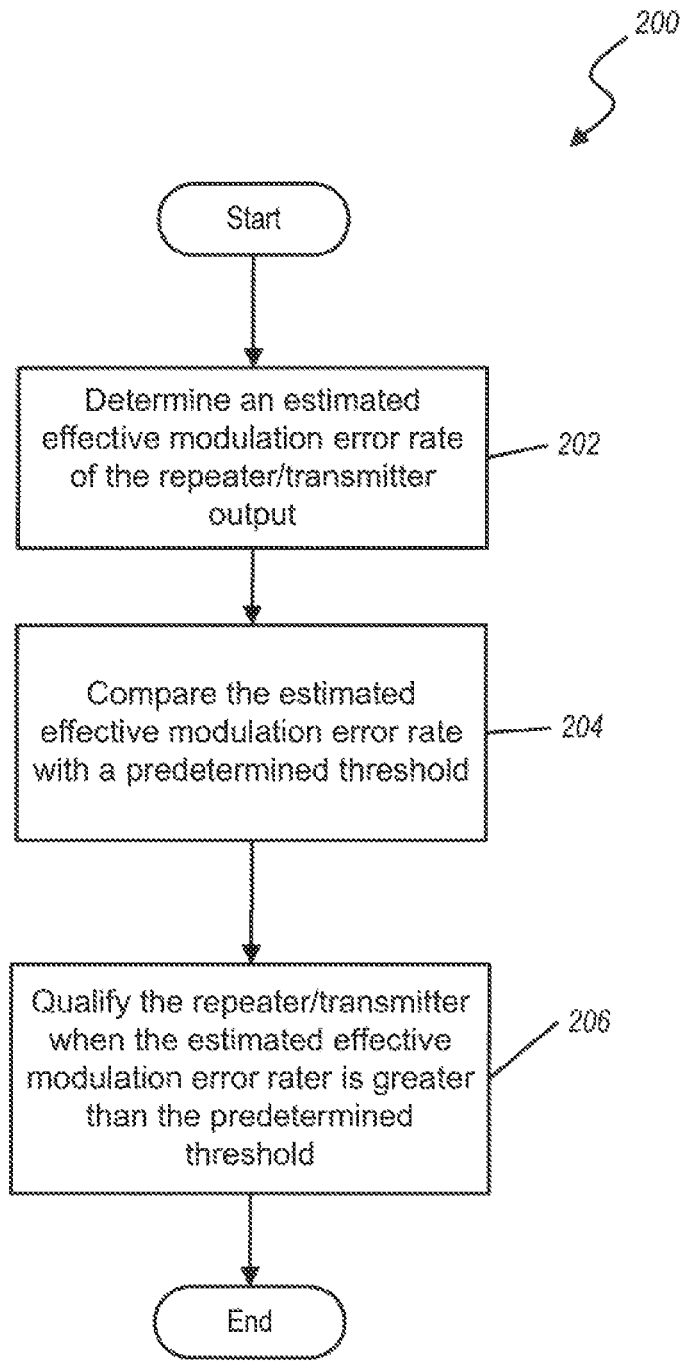
FIG. 2 illustrates an example of a method for testing the output of a repeater/transmitter.

An exemplary method 200 for testing the output of a repeater/transmitter using the above approximation expressed in equation (6) is illustrated in FIG. 2. As shown, method 200 includes determining an estimated or approximate effective modulation error ratio (MER) of the repeater/transmitter output as indicated at block 202. The process of block 202 may be effected, for example, by a testing module (e.g., module 114 in FIG. 1). Moreover, the estimation or approximation of the effective MER may be performed by hardware, software, or firmware as part of the testing module using a determined value of the linear MER and equation (6) above.

After the estimate of the effective MER is determine, the value is compared with a predetermined threshold as illustrated in block 204. After comparing the estimated effective MER with the predetermined threshold, the repeater/transmitter is qualified when the estimated effective MER is greater than the predetermined threshold as shown in block 206. The predetermined threshold may be determined based on a minimum desired degradation of the repeater/transmitter. More specifically, the relationship between degradation of the transmitter output varies inversely with the effective MER. Thus, for example, in order to ensure a low level of degradation, the threshold value for the effective MER needs to be set high, correspondingly. It is noted that the processes of blocks 204 and 206 may also be effected by a testing apparatus or module, such as module 114 in FIG. 1.

The method 200 thus operates to provide testing and/or qualification of repeater/transmitter by utilizing an estimated effective modulation error ratio. It is noted that the method 200 represents just one implementation and the changes, additions, deletions, combinations or other modifications of the method 200 are possible within the scope of the present disclosure. Although for purposes of simplicity of explanation, the method of FIG. 2 is shown and described as a series or number of acts, it is to be understood that the processes described herein are not limited by the order of acts, as some acts may occur in different orders and/or concurrently with other acts from that shown and described herein. For example, those skilled in the art will appreciate that a methodology could alternatively be represented as a series of interrelated states or events, such as in a state diagram. Moreover, not all illustrated acts may be required to implement a method in accordance with the present exemplary method disclosed.

Figure 3:
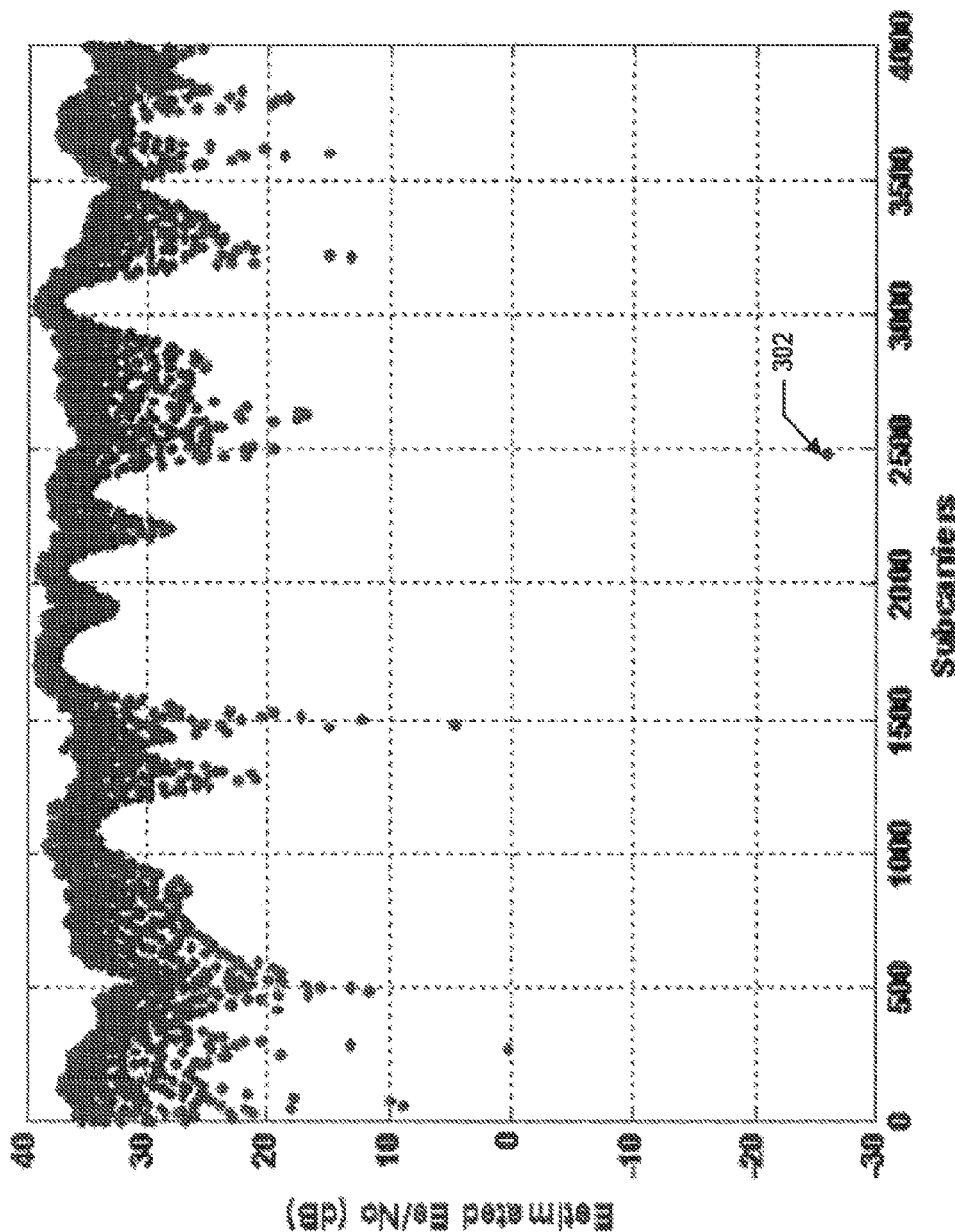
FIG. 3 shows an exemplary model plot of an effective modulation error ratio with respect to EsNo for a particular SNR range.

Under some extreme conditions, such as in some adjacent channel interference (ACI) tests, the MER of some sub-carriers can be negative (less than 0 dB MER) due to the null of the frequency selective channel. As an example of this case, the plot in FIG. 3 illustrates a case of at least one sub-carrier having an estimated symbol energy/noise power spectral density (Es/No or "EsNo) value (which is correlative to the total SNR or MER) as low as −26 dB, as delineated by point 302. Such a condition would render equation (6) above invalid, since the assumptions made to derive this equation no longer hold in this case (i.e., that the SNRs on all subcarriers are very close). Accordingly, the presently disclosed methods and apparatus may employ an additional methodology or algorithm to calculate the $MER_{effective}$ for such cases.

In particular, if it is assumed that the channel with $MER_{effective}$ has the same total channel capacity C, the following equation can be representative.

$$C = \frac{1}{N}\sum_n \log_2\left(1 + \frac{SNR_n}{1 + \alpha_n \cdot SNR_n}\right) \qquad (7)$$
$$= \log_2\left(1 + \frac{SNR}{1 + \alpha_{eff} \cdot SNR}\right).$$

Next, if it assumed that $SNR_n = SNR$, and $MER_{effective}(SNR) = -10\log_{10}(\alpha_{eff}(SNR))$, the closed form of $MER_{effective}$ as a function of SNR can be expressed as:

$$MER_{effective}(SNR) = \qquad (8)$$
$$-10 \cdot \log_{10}\left(\left(\prod_n \left(1 + \frac{SNR}{1 + \alpha_n \cdot SNR}\right)^{\frac{1}{N}} - 1\right)^{-1} - SNR^{-1}\right).$$

If the example of FIG. 3 is considered, where a subcarrier has an MER as low as −26 dB, one skilled in the art will appreciate that this condition renders equation (6) above invalid for making qualification of a repeater/transmitter.

Additionally, it is noted that for high SNR (e.g., 30 dB), the equation (8) can be rewritten as:

$$MER_{effective} = 10 \cdot \log_{10}\left(\prod_n (1 + MER_n)^{\frac{1}{N}} - 1\right). \qquad (9)$$

where $MER_n$ is the linear version of MER for a subcarrier n. Accordingly, equation (9) represents the limit of the effective MER when the SNR is very high.

Figure 4:
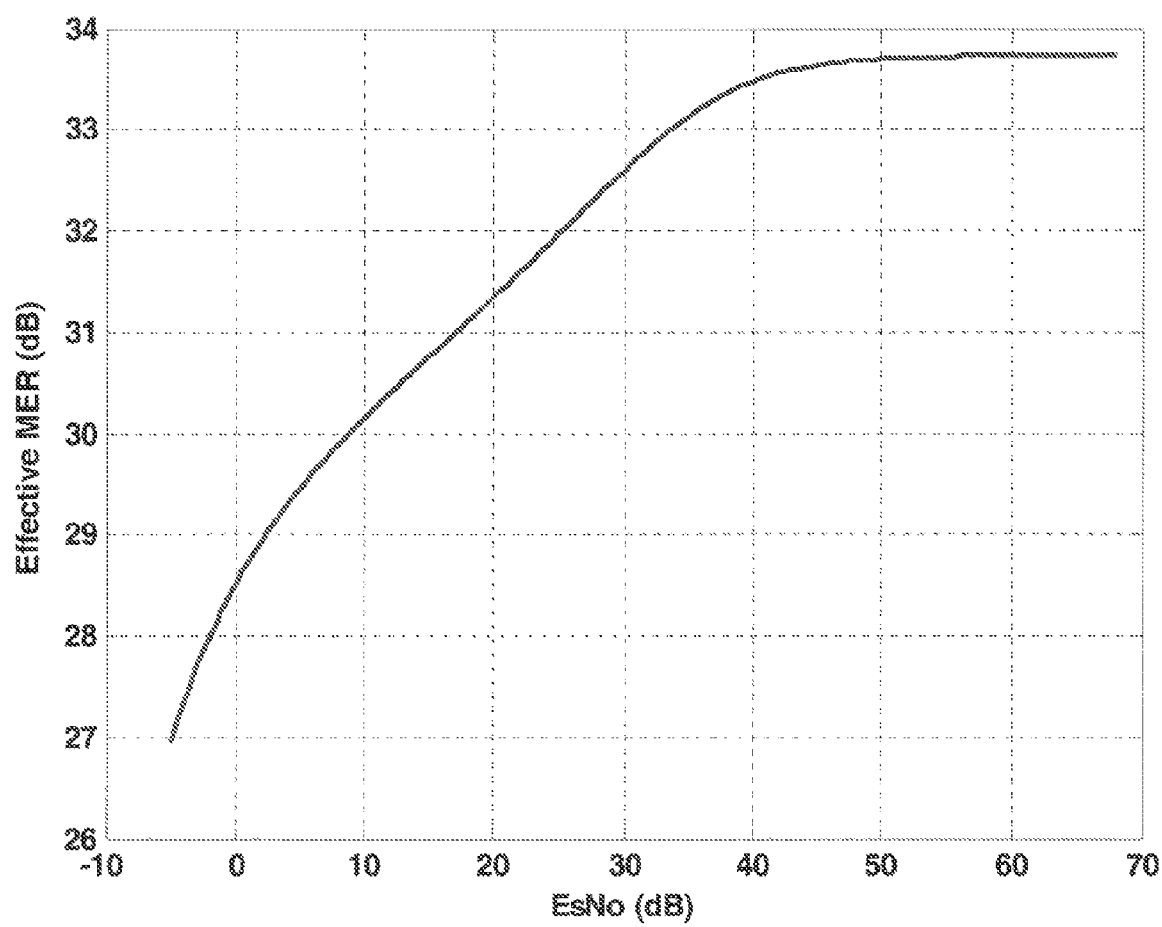
FIG. 4 shows an exemplary model plot of an effective MER in dB with respect to EsNo in dB

As an illustration, FIG. 4 shows an exemplary model plot of an effective MER in dB with respect to EsNo in dB as calculated with equation (8) above for a particular SNR operation range. A reasonable range of Es/No values may be determined with corresponding abscissa values in the plot providing a corresponding domain of effective MER values, from which a predetermined minimum MER value may be determined. In an example, the minimum MER value may be approximately 30 dB or greater.

Figure 5:
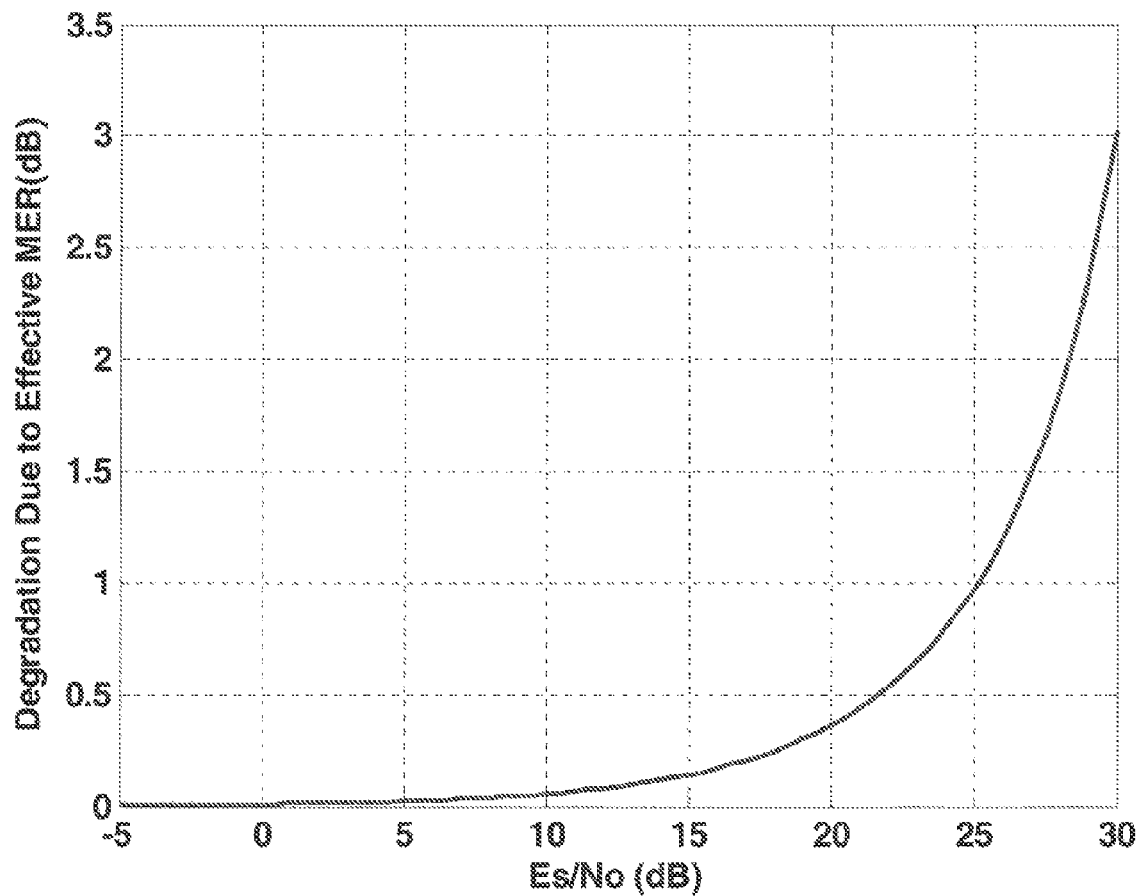
FIG. 5 shows a plot of the relationship between the degradation due to effective MER and EsNo.

Additionally, requirements may be set to ensure degradation is below a set amount due to interference from the effective MER. FIG. 5 shows a plot of the relationship between the degradation due to effective MER and Es/No, both in dB. It is noted that modeled system whose performance is illustrated is based on an SNR of 30 dB, where the $MER_{effective}$ reaches the limit of equation (9) above. In particular, when the SNR is −5 dB, the $MER_{effective}$ is 7 dB lower that the $MER_{effective}$ at 30 dB SNR. Furthermore, it is assumed that the $MER_{effective}$ for an operating SNR having a range of −5 dB to 30 dB is the linear interpolation between the $MER_{effective}$(−5 dB) and $MER_{effective}$(30 dB); i.e., that the $MER_{effective}$ is linear. Thus, in order to qualify the transmitter or repeater/transmitter as having a good $MER_{effective}$ at a high SNR, it is reasonable to assume that the worst case to be considered constitutes approximately these conditions, as an example. Thus, considering the modeled relationship in FIG. 5, in an exemplary system a way to specify repeater/transmitter performance (e.g., qualification) is to require that the degradation due to the interference from $MER_{effective}$ should be less than 0.5 dB, for example. Based on the plot in FIG. 5, it can be seen that a system having an EsNo or SNR less than approximately 22 dB will ensure that the degradation is less than the desired level of 0.5 dB. It is noted that for higher SNR values, although the degradation is higher, receiver performance remain unaffected, since the degraded SNR is higher than 22 dB.

Figure 6:
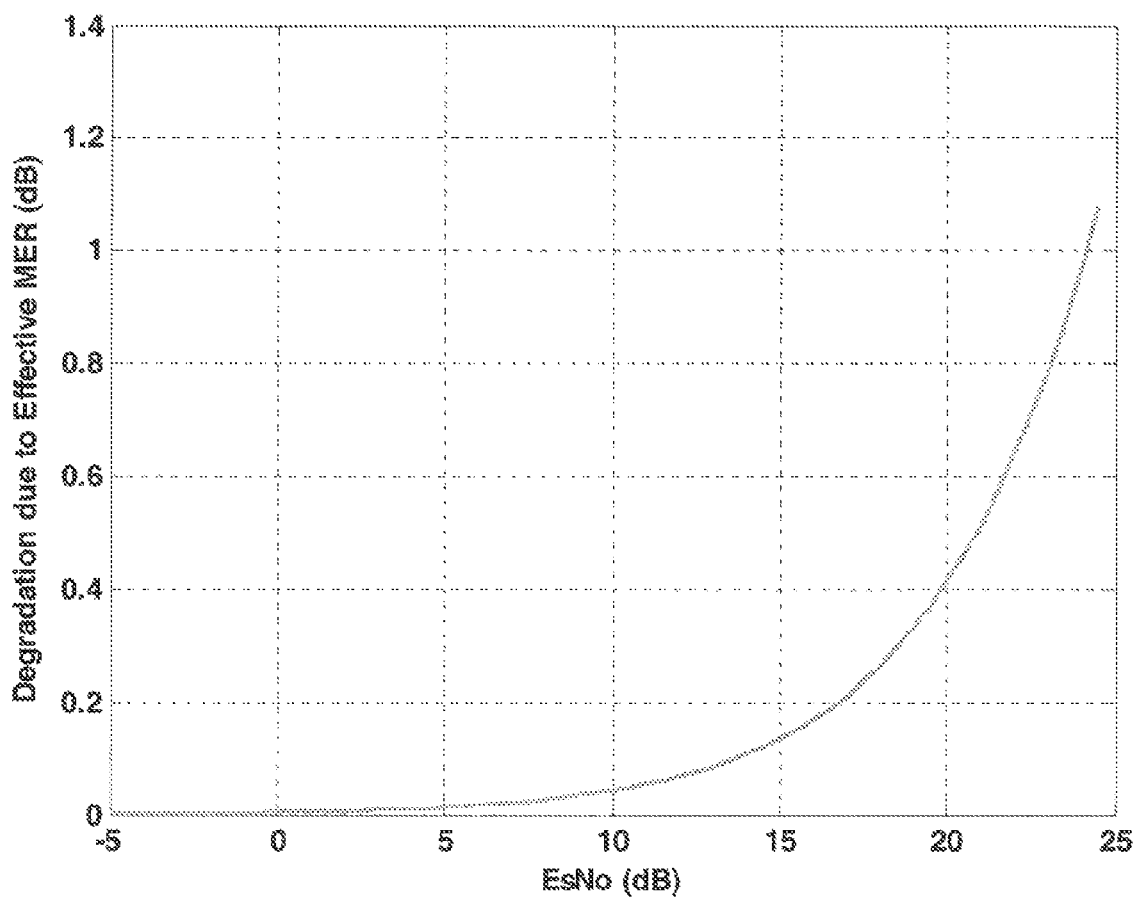
FIG. 6 illustrates an exemplary plot of the degradation due to effective MER in dB with respect to the EsNo in dB for a system with a $MER_{effective}$ of 30 dB.

It is further noted here that an alternative way to conservatively specify system performance (e.g., for purposes of transmitter or repeater/transmitter qualification) is to specify an effective MER ($MER_{effective}$) instead of degradation, as given in the example above. Thus, for example, a requirement may be made that the $MER_{effective}$ be no less than 30 dB over all SNR. FIG. 6 illustrates equation (8) in a plot of the degradation due to effective MER in dB with respect to the EsNo in dB for a system with an $MER_{effective}$ of 30 dB. As may be seen from FIG. 6, if a requirement for a minimum $MER_{effective}$ (e.g., 30 dB) is specified, the degradation will be less than 0.5 dB for an SNR having a value of no more than approximately 20.8 dB.

Figure 7:
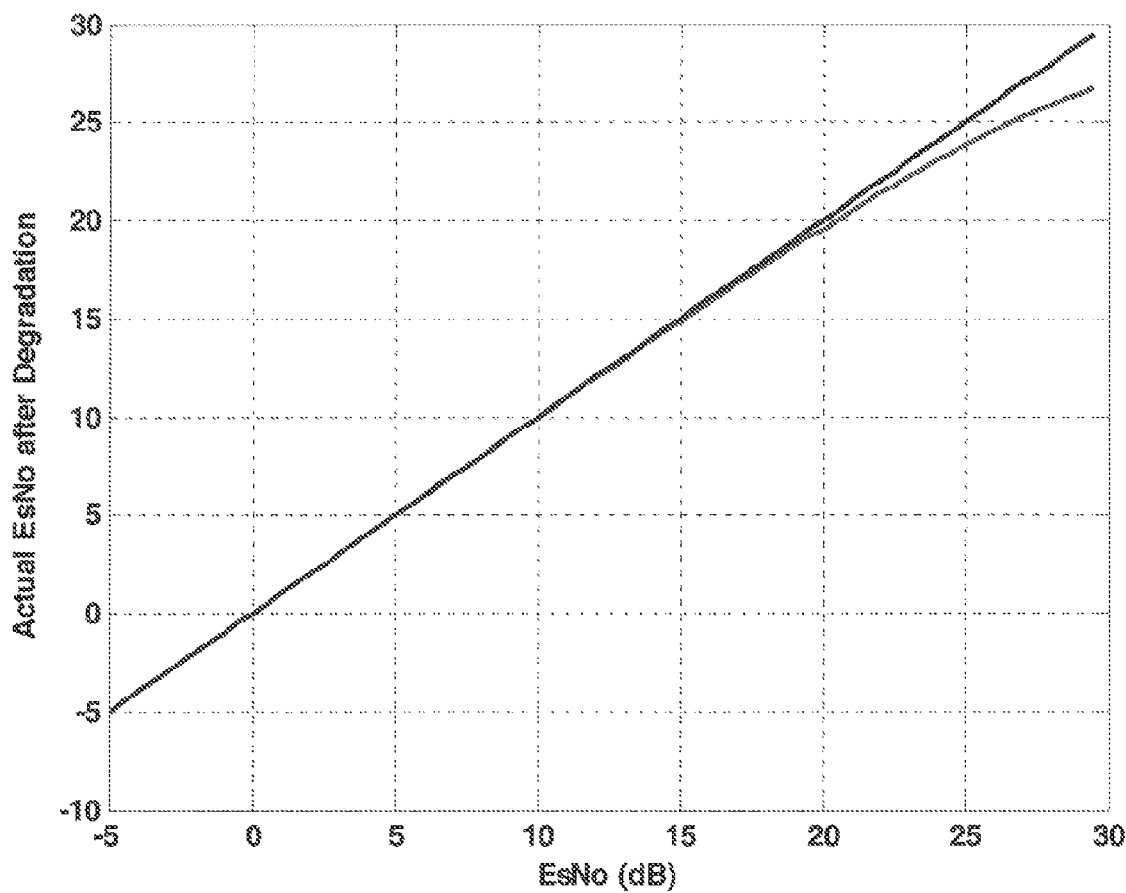
FIG. 7 illustrates a plot of the actual EsNo after degradation verses the EsNo in a repeater/transmitter.

Moreover, it can also be shown that for an SNR greater than 20.8 dB, the actual SNR after factoring in the degradation due to the 30 dB $MER_{effective}$ will never be less than approximately 20.8 dB. As an illustration, FIG. 7 illustrates a plot of the actual EsNo after degradation verses the EsNo. As may be seen in this plot, the actual SNR is shown to exceed an approximate 20.8 dB.

In light of the foregoing discussion, one skilled in the art will appreciate that the specifying a single effective MER value over an operational SNR range is justifiable.

Figure 8:
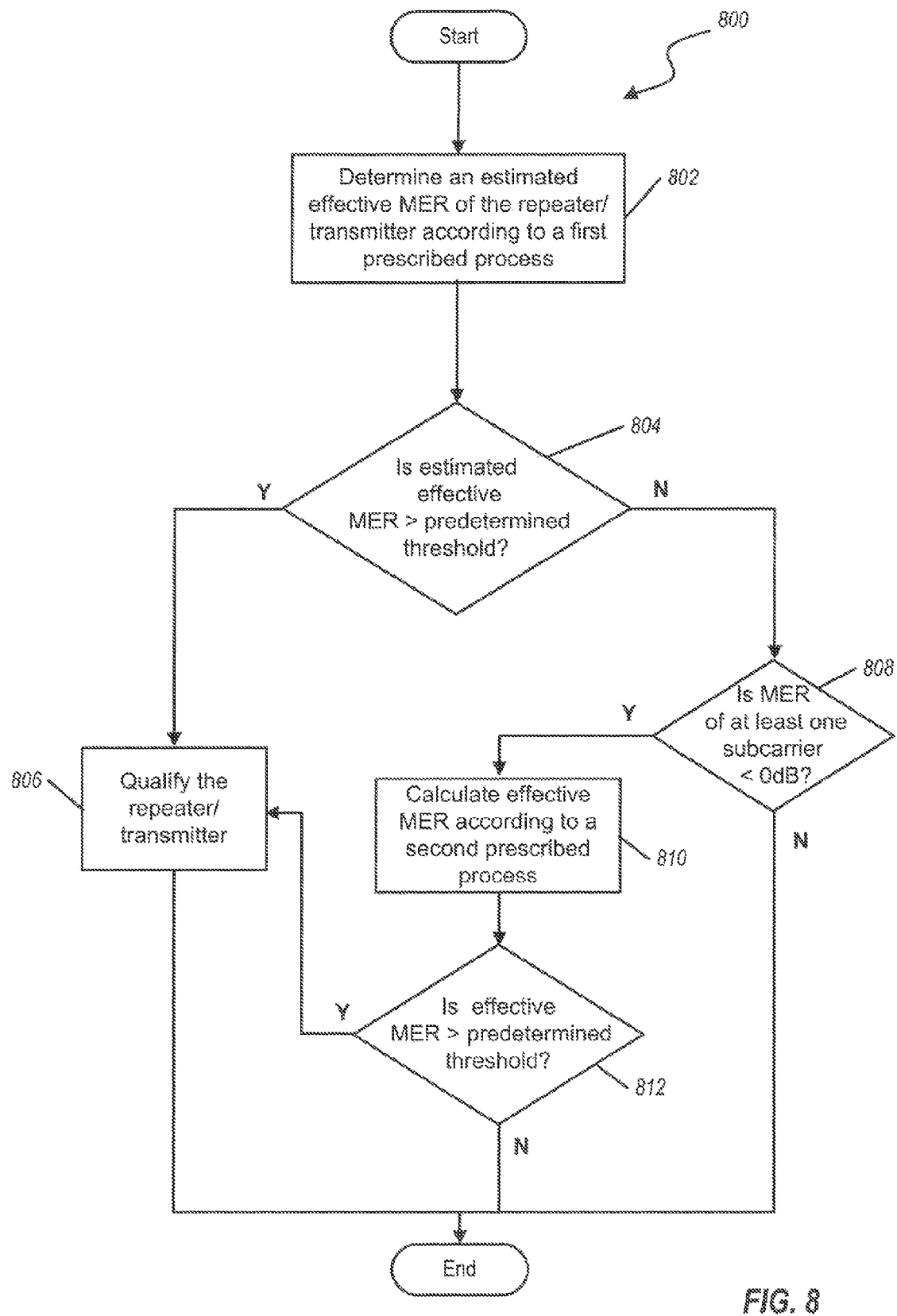
FIG. 8 illustrates another example of a method for testing the output of a repeater/transmitter.

FIG. 8 illustrates another method for testing a repeater/transmitter apparatus. In particular, a procedure 800 incorporates first and second prescribed processes for determine the effective MER for purposes of qualifying a repeater/transmitter, e.g., the processes of equations (6) and (8) or (9) discussed previously. As illustrated, after initialization, the process 800 begins with a determination of an estimated effective MER of the repeater/transmitter according to a first prescribed process as indicated in block 802. In an example, the first prescribed process is the algorithm expressed by equation (6) given above. As was noted above, the algorithm of equation (6) may alternatively characterized as determining an average noise variance of the repeater/transmitter across a plurality of sub-carriers of the multicarrier system Additionally, the estimation may include determination or measurement of the linear MER or retrieving this value from some other apparatus or logic. As an example of an implementation, the testing module 114 may effect the estimation of the $MER_{effective}$ in block 802

After determination of the estimated $MER_{effective}$ in block 802, the estimated effective MER is compared with a predetermined threshold to determine if the effective MER exceeds the threshold as shown in decision block 804. In particular, the threshold is a value predetermined to ensure a measure of performance of a repeater/transmitter and may be set to any number of desired values dependent on the desired level of performance. It is noted that the process in block 804 may be also performed by testing module 114, as an example.

If the $MER_{effective}$ is above the threshold as determined at block 804, the repeater/transmitter is then qualified as shown in block 806. After qualification in block 806, the process 800 is terminated. It is noted that as an example of an implementation, the testing module 114 may effect the estimation of the $MER_{effective}$ in block 802

Alternatively at block 804, if the estimated $MER_{effective}$ is not greater than the threshold, flow proceeds to decision block 808. In block 808, a determination is made whether the MER (e.g., $MER_n$ linear) of at least one subcarrier n is less than 0 dB. If the condition of block 808 results in "no", then no further determination is made and the process terminates. It is noted that this does not necessarily mean that the performance of the repeater/transmitter under test is bad.

Alternatively, if the condition of block 808 yields a "yes", this renders the estimated effective MER invalid since the assumptions it is based on are not true. Accordingly, an alternative or second prescribed process for calculating the effective MER (rather than the estimation of equation (6)) may be employed as indicated by block 810. In particular, either the relationship of equation (8) or equation (9) may comprise the second prescribed process, dependent on whether the SNR is high. It is noted that the testing module 114 may, for example, be used to implement the processes of blocks 808 and 810.

After the effective MER has been calculated at block 810, flow proceeds to decision block 812 for a determination whether the calculated effective MER is greater than the predetermined threshold. If no, the procedure 800 terminates, which again does not necessarily indicate bad performance of the repeater/transmitter. On other hand, if the condition of block 812 is yes, flow proceeds to block 806 where the repeater/transmitter is qualified. The process of block 812 may also be implemented by testing module 114, as an example.

The method 800 thus operates to provide testing and/or qualification of repeater/transmitter by utilizing an estimated effective modulation error ratio, as well as a calculated effective modulation error ratio when conditions are such that the estimated effective MER would be invalid. It is noted that the method 800 represents just one implementation and the changes, additions, deletions, combinations or other modifications of the method 800 are possible within the scope of the present disclosure. Although for purposes of simplicity of explanation, the method of FIG. 8 is shown and described as a series or number of acts, it is to be understood that the processes described herein are not limited by the order of acts, as some acts may occur in different orders and/or concurrently with other acts from that shown and described herein. For example, those skilled in the art will appreciate that a methodology could alternatively be represented as a series of interrelated states or events, such as in a state diagram. Moreover, not all illustrated acts may be required to implement a method in accordance with the present exemplary method disclosed.

Figure 9:
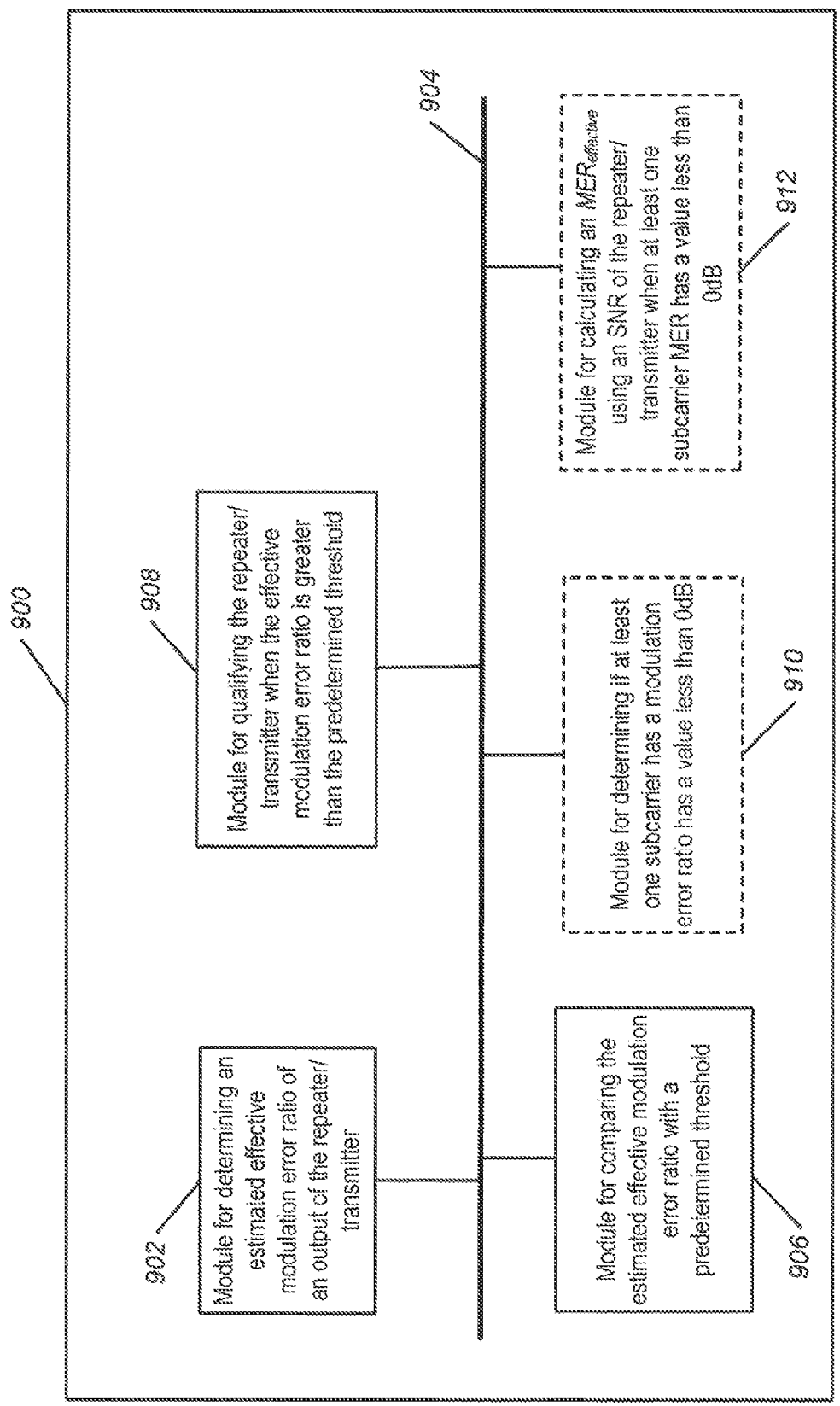
FIG. 9 illustrates an apparatus for testing a repeater/transmitter in a wireless communication system.

FIG. 9 illustrates an apparatus 900 for testing a repeater/transmitter in a wireless communication system. It is noted that apparatus 900 may be a testing module similar to module 114 in FIG. 1, or may be one or more processors implemented within a testing module or a transmitter for testing/qualifying transmitter performance. Apparatus 900 includes a first module 902 for determining an estimated effective modulation error ratio of an output of a repeater/transmitter, such as repeater/transmitter 108 illustrated in FIG. 1. It is noted that the determination of the estimate by module 902 may be accomplished using the algorithm of equation (6). Module 902 communicates the estimated $MER_{effective}$ to a bus 904 (or any other suitable means for effecting communication), for example, for communicating with other modules within apparatus 900.

Apparatus 900 also includes a second module 906 for comparing the estimated effective modulation error ratio with a predetermined threshold. Similar to the previous discussion, the threshold is a value predetermined to ensure a measure of performance of a repeater/transmitter and may be set to any number of desired values dependent on the desired level of performance. A third module 908 is included for qualifying the repeater/transmitter based on the comparison of module 906. That is, if the estimated $MER_{effective}$ is greater than the threshold, it is reasonable to qualify the repeater/transmitter as having good performance.

In addition to the modules above, additional fourth and fifth modules 910 and 912 may be included in the alternative for determining a calculated $MER_{effective}$ for particular warranted cases, such as when at least one subcarrier has an MER below 0 dB. Accordingly, module 910 may be provided for determining if at least one subcarrier has a modulation error ratio has a value less than 0 dB. Module 912 calculating an $MER_{effective}$ using an SNR of the repeater/transmitter when at least one subcarrier MER has a value less than 0 dB. Module 912 may employ the algorithms embodied by equations (8) or (9), dependent on the SNR level. Additionally, the calculated $MER_{effective}$ may be communicated with module 908, or a similarly configured module, to qualify the repeater/transmitter by comparing to the predetermined threshold (or an alternative predetermined threshold if a different threshold is desired for comparison of the calculated $MER_{effective}$ for purposes of qualifying the transmitter).

In light of the foregoing discussion, apparatus and methods are provided to test/qualify a repeater/transmitter in a multicarrier system, such as a FLO system. It is noted specifically that the presently disclosed apparatus and methods are also applicable to other multicarrier systems, such as DVB-T/H, and T-DMB systems, for testing or qualifying transmitters and repeater/transmitters.

As used in this application, the terms "component," "network," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

It will be appreciated that the memory device components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory device 118 of the presently disclosed apparatus and methods, for example, is intended to comprise, without being limited to, these and any other suitable types of memory.

What have been described above are exemplary aspects. It is, of course, not possible to describe every conceivable combination of components or methodologies for effecting the presently disclosed methods and apparatus, but one of ordinary skill in the art may recognize that many further combinations and permutations are possible. Accordingly, the disclosed examples are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. It is also noted that the word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

What is claimed is:

1. A method for qualifying a repeater/transmitter in a multicarrier system comprising:
   determining an estimated effective modulation error ratio of an output of the repeater/transmitter, wherein determining the estimated effective modulation error ratio includes:
      determining an inverse of a linear modulation error ratio for each subcarrier in the multicarrier system; and
      averaging each determined inverse of the linear modulation error ratio over a total number of subcarriers in the multicarrier system;
   comparing the estimated effective modulation error ratio with a predetermined threshold; and
   qualifying the repeater/transmitter as having acceptable performance if the estimated effective modulation error ratio is greater than the predetermined threshold, otherwise performing testing of the repeater/transmitter and determining a modulation error ratio of a subcarrier.

2. The method as defined in claim 1, wherein determining the estimated effective modulation error ratio is based on the equation:

$$MER_{effective} = -10 \cdot \log_{10}\left(\frac{1}{N}\sum_n \frac{1}{MER_n}\right)$$

where $MER_{effective}$ is the effective modulation error ratio in decibels, N is the total number of subcarriers, and $MER_n$ is the modulation error ratio of an $n^{th}$ subcarrier.

3. The method as defined in claim 1, further comprising:
determining if at least one subcarrier has a modulation error ratio value less than zero decibels;
calculating an effective modulation error ratio using a signal to noise ratio of the repeater/transmitter when the modulation error ratio of at least one subcarrier is determined to have a value less than zero decibels; and
qualifying the repeater/transmitter if the calculated effective modulation error ratio is above a prescribed value.

4. The method as defined in claim 3, wherein calculating the effective modulation error ratio is based on the equation:

$$MER_{effective}(SNR) = -10 \cdot \log_{10}\left(\left(\prod_n \left(1 + \frac{SNR}{1+\alpha_n \cdot SNR}\right)^{\frac{1}{N}} - 1\right)^{-1} - SNR^{-1}\right)$$

where SNR represents the signal to noise ratio, $MER_{effective}(SNR)$ is the effective modulation error as a function of the signal to noise, N is a total number of n subcarriers, and $\alpha_n$ is an inverse of an $n^{th}$ value of a linear modulation error ratio of subcarrier n.

5. The method as defined in claim 3, wherein calculating the effective modulation ratio includes determining a limit value of the calculated effective modulation error ratio when the signal to noise ratio is above a predetermined threshold.

6. The method as defined in claim 5, wherein the limit value of the calculated effective modulation error ratio is based on the equation:

$$MER_{effective} = 10 \cdot \log_{10}\left(\prod_n (1 + MER_n)^{\frac{1}{N}} - 1\right)$$

where $MER_{effective}$ is the effective modulation error, N is a total number of n subcarriers, and $MER_n$ an $n^{th}$ value of a linear modulation error ratio of subcarrier n.

7. The method as defined in claim 1, wherein determining the estimated effective modulation error ratio includes:
determining an average noise variance of the repeater/transmitter across a plurality of subcarriers of the multicarrier system.

8. An apparatus for testing a repeater/transmitter in a multicarrier system, the apparatus comprising:
a first module configured to determine an estimated effective modulation error ratio of an output of the repeater/transmitter, wherein the first module configured to determine the estimated effective modulation error ratio is further configured to:
determine an inverse of a linear modulation error ratio for each subcarrier in the multicarrier system; and
average each determined inverse of the linear modulation error ratio over a total number of subcarriers in the multicarrier system;
a second module configured to compare the estimated effective modulation error ratio with a predetermined threshold; and
a third module configured to qualify the repeater/transmitter when the estimated effective modulation error ratio is greater than the predetermined threshold, otherwise to perform testing of the repeater/transmitter and to determine a modulation error ratio of a subcarrier.

9. The apparatus as defined in claim 8, wherein the first module is configured to determine the estimated effective modulation error ratio based on the equation:

$$MER_{effective} = -10 \cdot \log_{10}\left(\frac{1}{N}\sum_n \frac{1}{MER_n}\right)$$

where $MER_{effective}$ is the effective modulation error ratio in decibels, N is the total number of subcarriers, and $MER_n$ is the modulation error ratio of an $n^{th}$ subcarrier.

10. The apparatus as defined in claim 8, further comprising:
a fourth module configured to determine if at least one subcarrier has a modulation error ratio value less than zero decibels;
a fifth module configured to calculate an effective modulation error ratio using a signal to noise ratio of the repeater/transmitter when the modulation error ratio of at least one subcarrier is determined to have with a value less than zero decibels; and
a sixth module for qualifying the repeater/transmitter if the calculated effective modulation error ratio is above a prescribed value.

11. The apparatus as defined in claim 10, wherein fifth module is configured to calculate the effective modulation error ratio based on the equation:

$$MER_{effective}(SNR) = -10 \cdot \log_{10}\left(\left(\prod_n \left(1 + \frac{SNR}{1+\alpha_n \cdot SNR}\right)^{\frac{1}{N}} - 1\right)^{-1} - SNR^{-1}\right)$$

where SNR represents the signal to noise ratio, $MER_{effective}(SNR)$ is the effective modulation error as a function of the signal to noise, N is a total number of n subcarriers, and $\alpha_n$ is an inverse of an $n^{th}$ value of a linear modulation error ratio of subcarrier n.

12. The apparatus as defined in claim 10, wherein the calculating the effective modulation ratio includes determining a limit value of the calculated effective modulation error ratio when the signal to noise ratio is above a predetermined threshold.

13. The apparatus as defined in claim 12, wherein the limit value of the calculated effective modulation error ratio is based on the equation:

$$MER_{effective} = 10 \cdot \log_{10}\left(\prod_n (1 + MER_n)^{\frac{1}{N}} - 1\right)$$

where $MER_{effective}$ is the effective modulation error, N is a total number of n subcarriers, and $MER_n$ an $n^{th}$ value of a linear modulation error ratio of subcarrier n.

14. The apparatus as defined in claim 8, wherein the module for determining the estimated effective modulation error ratio is further configured to determine an average noise variance of the repeater/transmitter across a plurality of subcarriers of the multicarrier system.

15. At least one processor configured to perform a method for qualifying a repeater/transmitter in a multicarrier system, the method comprising:
determining an estimated effective modulation error ratio of an output of the repeater/transmitter, wherein determining the estimated effective modulation error ratio of the method performed by the at least one processor includes:
 determining an inverse of a linear modulation error ratio for each subcarrier in the multicarrier system; and
 averaging each determined inverse of the linear modulation error ratio over a total number of subcarriers in the multicarrier system;
comparing the estimated effective modulation error ratio with a predetermined threshold; and
qualifying the repeater/transmitter when the estimated effective modulation error ratio is greater than the predetermined threshold, otherwise performing testing of the repeater/transmitter and determining a modulation error ratio of a subcarrier.

16. The at least one processor in claim 15, wherein determining the estimated effective modulation error ratio of the method performed by the at least one processor is based on the equation:

$$MER_{effective} = -10 \cdot \log_{10}\left(\frac{1}{N}\sum_n \frac{1}{MER_n}\right)$$

where $MER_{effective}$ is the effective modulation error ratio in decibels, N is the total number of subcarriers, and $MER_n$ is the modulation error ratio of an $n^{th}$ subcarrier.

17. The at least one processor as defined in claim 15, wherein the method for qualifying a repeater/transmitter in a communication network further comprises:
determining if at least one subcarrier has a modulation error ratio value less than zero decibels;
calculating an effective modulation error ratio using a signal to noise ratio of the repeater/transmitter when the modulation error ratio of at least one subcarrier is determined to have with a value less than zero decibels; and
qualifying the repeater/transmitter if the calculated effective modulation error ratio is above a prescribed value.

18. The at least one processor as defined in claim 17, wherein calculating the effective modulation error ratio is based on the equation:

$$MER_{effective}(SNR) = -10 \cdot \log_{10}\left(\left(\prod_n \left(1 + \frac{SNR}{1+\alpha_n \cdot SNR}\right)^{\frac{1}{N}} - 1\right)^{-1} - SNR^{-1}\right)$$

where SNR represents the signal to noise ratio, $MER_{effective}(SNR)$ is the effective modulation error as a function of the signal to noise, N is a total number of n subcarriers, and $\alpha_n$ is an inverse of an $n^{th}$ value of a linear modulation error ratio of subcarrier n.

19. The at least one processor as defined in claim 17, wherein calculating the effective modulation ratio includes determining a limit value of the calculated effective modulation error ratio when the signal to noise ratio is above a predetermined threshold.

20. The at least one processor as defined in claim 19, wherein the limit value of the calculated effective modulation error ratio is based on the equation:

$$MER_{effective} = 10 \cdot \log_{10}\left(\prod_n (1+MER_n)^{\frac{1}{N}} - 1\right)$$

where $MER_{effective}$ is the effective modulation error, N is a total number of n subcarriers, and $MER_n$ an $n^{th}$ value of a linear modulation error ratio of subcarrier n.

21. The at least one processor as defined in claim 15, wherein
determining the estimated effective modulation error ratio includes:
determining an average noise variance of the repeater/transmitter across a plurality of subcarriers of the multicarrier system.

22. An apparatus for testing a repeater/transmitter in a multicarrier system comprising:
means for determining an estimated effective modulation error ratio of an output of the repeater/transmitter, wherein the means for determining the estimated effective modulation error ratio includes:
 means for determining an inverse of a linear modulation error ratio for each subcarrier in the multicarrier system; and
 means for averaging each determined inverse of the linear modulation error ratio over a total number of subcarriers in the multicarrier system;
means for comparing the estimated effective modulation error ratio with a predetermined threshold; and
means for qualifying the repeater/transmitter when the estimated effective modulation error ratio is greater than the predetermined threshold, otherwise means for performing testing of the repeater/transmitter and determining a modulation error ratio of a subcarrier.

23. The apparatus as defined in claim 22, wherein the means for determining the estimated effective modulation error ratio utilizes the equation:

$$MER_{effective} = -10 \cdot \log_{10}\left(\frac{1}{N}\sum_n \frac{1}{MER_n}\right)$$

where $MER_{effective}$ is the effective modulation error ratio in decibels, N is the total number of subcarriers, and $MER_n$ is the modulation error ratio of an $n^{th}$ subcarrier.

24. The apparatus as defined in claim 22, further comprising:
means for determining if at least one subcarrier has a modulation error ratio value less than zero decibels;
means for calculating an effective modulation error ratio using a signal to noise ratio of the repeater/transmitter when the modulation error ratio of at least one subcarrier is determined to have with a value less than zero decibels; and
means for qualifying the repeater/transmitter if the calculated effective modulation error ratio is above a prescribed value.

25. The apparatus as defined in claim 24, wherein the means for calculating the effective modulation error ratio utilizes the equation:

$$MER_{\textit{effective}}(SNR) = -10 \cdot \log_{10}\left(\left(\prod_n \left(1 + \frac{SNR}{1+\alpha_n \cdot SNR}\right)^{\frac{1}{N}} - 1\right)^{-1} - SNR^{-1}\right)$$

where SNR represents the signal to noise ratio, $MER_{\textit{effective}}(SNR)$ is the effective modulation error as a function of the signal to noise, N is a total number of n subcarriers, and $\alpha_n$ is an inverse of an $n^{th}$ value of a linear modulation error ratio of subcarrier n.

26. The apparatus as defined in claim 24, wherein the means for calculating the effective modulation ratio includes means for determining a limit value of the calculated effective modulation error ratio when the signal to noise ratio is above a predetermined threshold.

27. The apparatus as defined in claim 26, wherein the means for determining the limit value of the calculated effective modulation error ratio utilizes the equation:

$$MER_{\textit{effective}} = -10 \cdot \log_{10}\left(\prod_n (1 + MER_n)^{\frac{1}{N}} - 1\right)$$

where $MER_{\textit{effective}}$ is the effective modulation error, N is a total number of n subcarriers, and $MER_n$ an $n^{th}$ value of a linear modulation error ratio of subcarrier n.

28. The apparatus as defined in claim 22, wherein determining the estimated effective modulation error ratio includes:
  determining an average noise variance of the repeater/transmitter across a plurality of subcarriers of the multicarrier system.

29. A computer-related entity, comprising:
  a non-transitory computer-readable medium comprising:
    code for causing a computer to determine an estimated effective modulation error ratio of an output of the repeater/transmitter, wherein the code for causing a computer to determine the estimated effective modulation error ratio includes:
      code for causing a computer to determine an inverse of a linear modulation error ratio for each subcarrier in the multicarrier system; and
      code for causing a computer to average each determined inverse of the linear modulation error ratio over a total number of subcarriers in the multicarrier system;
    code for causing the computer to compare the estimated effective modulation error ratio with a predetermined threshold; and
    code for causing the computer to qualify the repeater/transmitter when the estimated effective modulation error ratio is greater than the predetermined threshold, otherwise code for causing the computer to perform testing of the repeater/transmitter and determining a modulation error ratio of a subcarrier.

30. The computer-related entity as defined in claim 29, wherein the code for causing a computer to determine the estimated effective modulation error ratio is based on the equation:

$$MER_{\textit{effective}} = -10 \cdot \log_{10}\left(\frac{1}{N}\sum_n \frac{1}{MER_n}\right)$$

where $MER_{\textit{effective}}$ is the effective modulation error ratio in decibels, N is the total number of subcarriers, and $MER_n$ is the modulation error ratio of an $n^{th}$ subcarrier.

31. The computer-related entity as defined in claim 29, wherein the computer-readable medium further comprises:
  code for causing a computer to determine if at least one subcarrier has a modulation error ratio value less than zero decibels;
  code for causing a computer to calculate an effective modulation error ratio using a signal to noise ratio of the repeater/transmitter when the modulation error ratio of at least one subcarrier is determined to have with a value less than zero decibels; and
  code for causing a computer to qualify the repeater/transmitter if the calculated effective modulation error ratio is above a prescribed value.

32. The computer-related entity as defined in claim 31, wherein the code for causing a computer to calculate the effective modulation error ratio is based on the equation:

$$MER_{\textit{effective}}(SNR) = -10 \cdot \log_{10}\left(\left(\prod_n \left(1 + \frac{SNR}{1+\alpha_n \cdot SNR}\right)^{\frac{1}{N}} - 1\right)^{-1} - SNR^{-1}\right)$$

where SNR represents the signal to noise ratio, $MER_{\textit{effective}}(SNR)$ is the effective modulation error as a function of the signal to noise, N is a total number of n subcarriers, and $\alpha_n$ is an inverse of an $n^{th}$ value of a linear modulation error ratio of subcarrier n.

33. The computer-related entity as defined in claim 31, wherein the code for causing a computer to calculate the effective modulation ratio includes code for causing a computer to determine a limit value of the calculated effective modulation error ratio when the signal to noise ratio is above a predetermined threshold.

34. The computer-related entity as defined in claim 33, wherein the limit value of the calculated effective modulation error ratio is based on the equation:

$$MER_{\textit{effective}} = -10 \cdot \log_{10}\left(\prod_n (1 + MER_n)^{\frac{1}{N}} - 1\right)$$

where $MER_{\textit{effective}}$ is the effective modulation error, N is a total number of n subcarriers, and $MER_n$ an $n^{th}$ value of a linear modulation error ratio of subcarrier n.

35. The computer-related entity as defined in claim 29, wherein the code for causing the computer to determine the estimated effective modulation error ratio includes:
  code for causing a computer to determine an average noise variance of the repeater/transmitter across a plurality of subcarriers of a multicarrier system.

* * * * *